(12) United States Patent
Larsen et al.

(10) Patent No.: US 11,795,118 B2
(45) Date of Patent: Oct. 24, 2023

(54) COMBUSTION CHAMBER HOT FACE REFRACTORY LINING

(71) Applicants: Haldor Topsoe A/S, Kgs. Lyngby (DK); P-D Refractories GmbH, Bochum (DE)

(72) Inventors: Johannes Ruben Larsen, Fredericia (DK); Fred Brunk, Hattingen (DE); Thomas Sandahl Christensen, Kgs. Lyngby (DK); Søren Gyde Thomsen, Kgs. Lyngby (DK)

(73) Assignees: Topsoe A/S, Kgs. Lyngby (DK); P-D Refractories GmbH, Bochum (DE)

( * ) Notice: Subject to any disclaimer, the term of this patent is extended or adjusted under 35 U.S.C. 154(b) by 130 days.

(21) Appl. No.: 17/173,335

(22) Filed: Feb. 11, 2021

(65) Prior Publication Data
US 2021/0188722 A1     Jun. 24, 2021

Related U.S. Application Data

(62) Division of application No. 16/332,091, filed as application No. PCT/EP2017/075641 on Oct. 9, 2017, now abandoned.

(30) Foreign Application Priority Data

Oct. 7, 2016   (DK) .......................... PA 2016 00605

(51) Int. Cl.
   *C04B 35/484*   (2006.01)
   *B01J 12/00*    (2006.01)
   (Continued)

(52) U.S. Cl.
   CPC .......... *C04B 41/5042* (2013.01); *B01J 12/005* (2013.01); *B01J 19/02* (2013.01);
   (Continued)

(58) Field of Classification Search
   CPC ..... C04B 35/48; C04B 35/482; C04B 35/484; F23D 14/66; F23D 14/34; F23D 14/60; B01J 19/02
   See application file for complete search history.

(56) References Cited

U.S. PATENT DOCUMENTS 2,854,739 A   10/1958  Bartlett
2,906,007 A    9/1959  Bibbins
(Continued)

FOREIGN PATENT DOCUMENTS

DE   10 2008 027 882 A1   12/2009
EP       0 235 936 A1      9/1987
(Continued)

OTHER PUBLICATIONS

H. Tsubakino et al., "Effect of Alumina Addition on the Tetragonal-to-Monoclinic Phase Transformation in Zirconia −3 mol% Yttria," Journal of the American Ceramic Society, vol. 74, No. 2, pp. 440-443, 1991.

*Primary Examiner* — Karl E Group
(74) *Attorney, Agent, or Firm* — Blank Rome LLP

(57) ABSTRACT

A refractory lining in a combustion chamber operating in a reducing atmosphere. The lining includes at least one or more Zirconia (Zr)-based refractory lining members comprising one or more Zr-based parts. The Zr-based parts comprise at least 90 wt. %, preferably at least 95 wt. %, of monoclinic $ZrO_2$ and/or partially stabilized $ZrO_2$ and/or fully stabilized $ZrO_2$, wherein the total content of tetragonal and cubic $ZrO_2$ amounts to at least 20 wt. %, preferably more than 35 wt. %, as well as Zr based refractory lining members and methods for manufacturing the Zr based refractory lining members.

4 Claims, 4 Drawing Sheets

(51) Int. Cl.
  *B01J 19/02* (2006.01)
  *C04B 41/50* (2006.01)
  *C04B 41/87* (2006.01)
  *C04B 41/00* (2006.01)
  *C04B 35/486* (2006.01)
  *C01B 3/36* (2006.01)
  *C01B 3/38* (2006.01)
  *C04B 35/488* (2006.01)
  *C04B 35/622* (2006.01)
  *C10J 3/72* (2006.01)
  *C04B 111/00* (2006.01)

(52) U.S. Cl.
  CPC ............... *C01B 3/36* (2013.01); *C01B 3/386* (2013.01); *C04B 35/484* (2013.01); *C04B 35/486* (2013.01); *C04B 35/4885* (2013.01); *C04B 35/62222* (2013.01); *C04B 41/009* (2013.01); *C04B 41/87* (2013.01); *C10J 3/72* (2013.01); *B01J 2219/0218* (2013.01); *C01B 2203/0261* (2013.01); *C01B 2203/1235* (2013.01); *C04B 2111/0025* (2013.01); *C04B 2235/3217* (2013.01); *C04B 2235/3244* (2013.01); *C04B 2235/3246* (2013.01); *C04B 2235/3418* (2013.01); *C04B 2235/604* (2013.01); *C04B 2235/72* (2013.01); *C04B 2235/76* (2013.01); *C04B 2235/762* (2013.01); *C04B 2235/765* (2013.01); *C04B 2235/77* (2013.01); *C04B 2235/786* (2013.01); *C04B 2235/96* (2013.01); *C04B 2235/9669* (2013.01)

(56) References Cited

U.S. PATENT DOCUMENTS

| | | |
|---|---|---|
| 3,175,919 A | 3/1965 | Smoot et al. |
| 3,887,387 A | 6/1975 | Sturhahn |
| 4,344,904 A | 8/1982 | Yamada et al. |
| 4,513,089 A | 4/1985 | Kummer et al. |
| 4,659,680 A | 4/1987 | Guile |
| 4,835,123 A | 5/1989 | Bush |
| 4,975,397 A | 12/1990 | Dworak et al. |
| 5,562,998 A | 10/1996 | Strangman |
| 5,780,178 A | 7/1998 | Jones |
| 6,284,692 B1 | 9/2001 | Jue et al. |
| 7,601,442 B2 | 10/2009 | Hoshino |
| 7,807,098 B2 | 10/2010 | Bangaru |
| 10,370,298 B2* | 8/2019 | Osborne .................. C01B 3/40 |
| 2007/0207334 A1 | 9/2007 | Kajino |
| 2011/0220285 A1 | 9/2011 | Lee et al. |
| 2013/0280638 A1 | 10/2013 | Levy |
| 2018/0290931 A1* | 10/2018 | Osborne ................ B01J 8/0453 |

FOREIGN PATENT DOCUMENTS

| | | |
|---|---|---|
| EP | 1 772 441 A1 | 4/2007 |
| JP | 08026860 A | 1/1996 |
| WO | WO 90/15020 A2 | 12/1990 |

\* cited by examiner

COMBUSTION CHAMBER HOT FACE REFRACTORY LINING

CROSS-REFERENCE TO RELATED APPLICATIONS

This is a divisional of U.S. patent application Ser. No. 16/332,091, filed Mar. 11, 2019, now abandoned, which is a national stage of PCT/EP2017/075641, filed Oct. 9, 2017, which claims foreign priority to Denmark Application No. PA 2016 00605, filed Oct. 7, 2016, the disclosures of which are incorporated by reference in their entireties herein.

BACKGROUND OF THE INVENTION

1. Field of the Invention

The present innovation is related to a zirconia based lining material for gasification plants, especially for gasification plants in which synthesis gas (syngas) is produced in a reducing atmosphere in particular refractory material for use in the combustion chamber of a vessel for producing hydrogen and carbon monoxide rich syngas at high temperatures above 1000° C. and at high pressures above 20 bar.

2. Description of the Related Art

Syngas is a gas mixture consisting primarily of hydrogen and carbon monoxide. It can be produced from a variety of hydrocarbon fuel sources, e. g. natural gas, refinery off-gas, LPG or naphtha, by reaction with steam, air, pure oxygen and/or carbon dioxide at very high temperatures. The syngas is the main feedstock for the production of higher value fuels and chemicals such as methanol, ammonia and synthetic fuels.

Essentially, there are two different pathways to produce syngas on an industrial scale using high-temperature reactors. In the non-catalytic process, a substoichiometric fuel-air mixture or fuel-oxygen mixture is partially combusted in a cylindrical reactor at temperatures between 1000° C. and 1700° C. and at high pressures of up to 150 bar. The raw syngas leaves the combustion chamber for downstream treatments with a temperature of more than 1000° C. In the catalytic pathway, the combustion chamber and a catalyst bed, which equilibrates the syngas, are located in the same cylindrical vessel. Usually, at least one layer, being permeable to gases and comprising regular shaped or lumpy materials, separates the combustion chamber from the underneath situated catalyst bed. This is necessary in order to avoid a thermal overstressing of the upper catalyst layer and to prevent any disruptions and agitating of the catalyst bed during operation. The uppermost surface of this partition therefore acts as the bottom lining of the combustion chamber, in which temperatures of up to 1700° C. (mixed gases) and high process pressures of up to 150 bar are prevailing. The outlet temperature of the syngas from the catalyst bed is between about 850° C. and 1100° C.

The above mentioned reactor pressure vessels are lined on the inside with a multilayer refractory lining which ensures that the temperature of the outer steel shell remains appreciably lower than the temperature of the process gases passing inside the vessels. High alumina refractories with an $Al_2O_3$ content 93 wt. % are traditionally used for the inner wall layer ("hot face"). These coarse ceramic refractories, which typically have low silica and iron content, are dense castables or dense bricks being installed individually or in combination with each other. For vessels with catalytic operation, the partition between the combustion zone and the catalytic zone are traditionally also made from a high alumina material. When designing the lining of the combustion chamber, a thermal cycling of the inner hot face material, which in particular occurs during shut-down and restart of the vessel, should also be taken into account.

Due to the strongly reducing atmosphere, elevated temperatures and high process pressures prevailing in the combustion chamber, it has been found by the applicant that even extremely high fired and chemically ultrapure alumina bricks (>99% $Al_2O_3$, also known as alpha corundum bricks) exhibit a volatilization of solid $Al_2O_3$. Moreover, we have found that this volatilization takes place over time of operation, even though the alumina material has aged in-situ sufficiently. This corrosive effect of volatilization, which may vary within the chamber, can be measured directly as loss of material or loss of thickness. For example, overall material losses on the combustion chamber's hot face lining of greater than 10 gram/day/m2 have been determined by the applicant. The mechanism of $Al_2O_3$-volatilization is formation of gaseous aluminum sub-oxides and/or aluminum hydroxide. In this connection, particular attention must be given to the temperature-dependence of the alumina-volatilization, which is characterized by an exponential growth with increasing temperature above 1200° C. Therefore, in some cases even very small temperature changes of e.g. ±5° C. may have a strong impact on the degree of volatilization of alumina material when applied at high temperatures.

As part of the syngas flow, these gaseous aluminous products migrate from the inner lining of the combustion chamber to downstream process stages. Here, during cooling down, they condense out which can lead to fouling of downstream equipment or to pressure drop build-up and to various considerable problems which in turn can cause unnecessary treatment operations and substantial costs. Besides reducing the overall efficiency of individual sections of installation and equipment, even a plugging of process gas channels or tubes has been observed. E.g., when operating the catalytic-process, the gaseous alumina solidifies within the catalyst bed, thereby creating a layer of crystalline deposit onto the catalyst shapes. This has the effect of gradually agglomerating the catalyst shapes together, blocking the flow passages and leading to a build-up in pressure drop over the catalyst bed as well as a gas mal-distribution, which often results in a premature shut-down for replacing the top catalyst layer.

Due to the corrosive wear caused by the alumina-volatilization, the risk of a bypass of the hot process gas through the refractory, which e.g. may increase the risk of a potential overheating at the steel shell, which ultimately may require large and very costly repairs, is especially high in the combustion chamber where the temperature is highest.

To deal with the aforementioned problem of $Al_2O_3$-volatilization taking place in the combustion chamber, several proposals have been submitted which, however, only indicate approaches for the design of separate downstream processes for mitigating the negative impacts taking place here (e. g. EP 0625 481 B1, US 2014/0332727, WO 2012/131318, EP 0583 211 A2). A solution to reduce a priori $Al_2O_3$-volatilization in the combustion chamber has not been provided yet.

SUMMARY OF THE INVENTION

Thus, an object of the present invention is to overcome the above mentioned disadvantages. This object is achieved by the features contained in the independent claims. Advantageous variants of the invention are described in the accompanying claims.

It is therefore an aspect of the present invention to provide a refractory lining in a combustion chamber operating at temperatures above 1000° C. and pressures at least partially above 20 bar preferably in a reducing atmosphere, such as a combustion chamber for producing hydrogen and carbon monoxide rich gases, with an inner lining layer presenting an improved resistance against material volatilization compared to the above described refractories made from high alumina, even under thermal cycling.

In another object of the present invention, a zirconia (Zr) refractory material for the inner layer of the lining is provided whereby the layer thickness can be adjusted in the range between 100 μm and 250 mm, preferably between 150 μm and 160 mm, in order to meet individual application requirements as well as to take into account economic aspects.

These and other advantages are provided by a Zr based refractory lining member comprising one or more Zr-based parts, wherein the Zr-based parts comprise at least 90 wt. %, preferably at least 95 wt. %, of monoclinic $ZrO_2$ and/or partially stabilized $ZrO_2$ and/or fully stabilized $ZrO_2$, wherein the total content of tetragonal and cubic $ZrO_2$ amounts to at least 20 wt. %, preferably more than 35 wt. %.

DETAILED DESCRIPTION OF THE PREFERRED EMBODIMENTS

Figure 1:
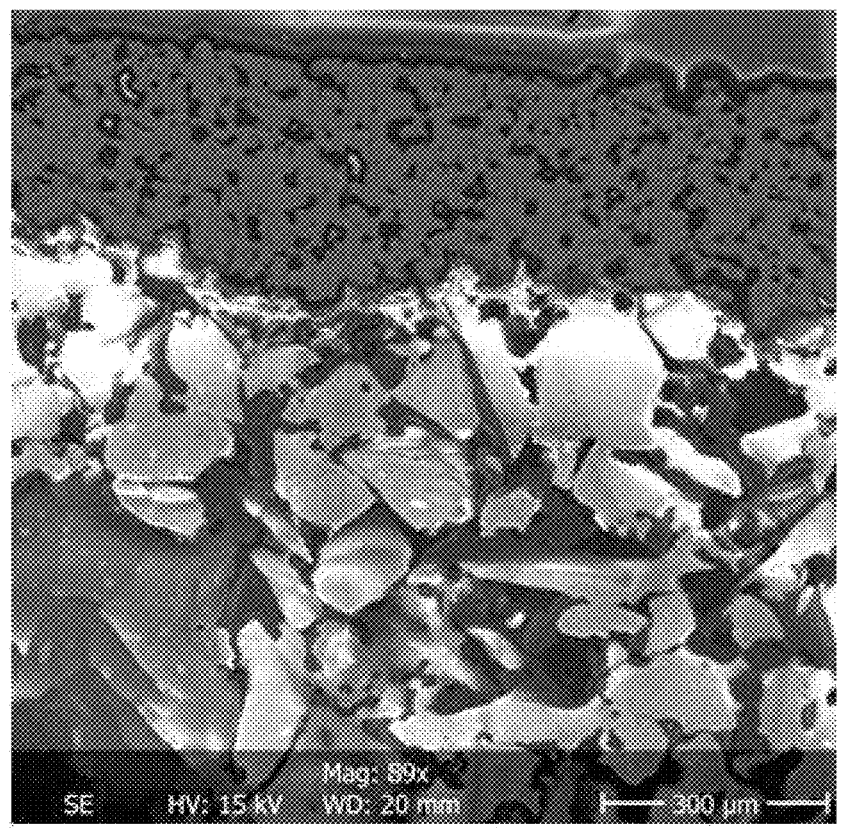
FIG. 1 is a cross-sectional electro microscopic image showing the structure of a zirconia based refractory lining member in form of a coating on an $Al_2O_3$ based refractory material according to the invention.

Compared to $Al_2O_3$, $ZrO_2$ reveals a well-known higher thermodynamic stability against reduction at temperatures above 1200° C., which can be equated with a lower affinity to volatilization (Barin, I.: Thermochemical Data of Pure Substances. Wiley-VCH, 2004. ISBN 3-527-30993-4). Despite their higher specific weight, zirconia refractories exhibit a significantly lower thermal conductivity in comparison to the above mentioned dense alumina refractories. Moreover, zirconia refractories exhibit the highest ratio of bulk density to thermal conductivity of all oxidic refractories. This results in additional significant benefits for special areas of the application, which is described later.

An overview of zirconia and alumina refractories is found for instance in "Handbook of Refractory Materials", editors G. Routschka and H. Wuthnow; (ISBN 978-3-8027-3162-4).

$ZrO_2$ appears in form of monoclinic (m), tetragonal (t) and cubic (c) crystal modifications. The transformation from monoclinic to tetragonal and back takes place at approx. 1150° C. on heating and at approx. 800° C. on cooling. This phase transformation is notoriously of significant technical importance because this effects a critical volume change. Therefore, this temperature-dependent transformation would induce large stresses and consequently a critical crack formation at temperature changes, e. g. during the heat treatment as part of the manufacturing as well as during later use.

Such critical crack formation can be counteracted by a defined insertion of so-called stabilizers in the $ZrO_2$ crystal lattice, especially calcium oxide (CaO), magnesium oxide (MgO) and/or yttrium oxide ($Y_2O_3$), and cerium oxide ($CeO_2$). Scandium oxide ($ScO_3$) or ytterbium oxide ($YbO_3$) is also used in some cases. Depending on the type and the amount used of these stabilizers, a very rough subdivision is made between partially and fully stabilized $ZrO_2$, which, however, says little about the specific mineralogical composition of the zirconia refractory material. The granular zirconia raw materials used for refractory applications do not have a homogenous microstructure. Even within a grain of fully stabilized zirconia, precipitates of tetragonal and monoclinic zirconia may be found which also has to be taken into consideration when formulating and manufacturing a material for a specific application and use. Furthermore, a more or less pronounced change in mineralogical composition of the zirconia raw material used may occur during thermal treatment, depending mainly on formulation and parameters of thermal treatment itself. This has also to be considered when formulating and manufacturing a material.

In contrast to the t-phase, the so-called t'-phase is formed by a diffusionless transformation from the cubic phase by rapid quenching and is believed to be non-transformable. The t'-phase's quite different morphology is characterized by an extremely fine size of the domains.

It is well known that even a small amount of impurities, for example such as silica or alumina, can lead to a clearly measurable decrease of the sum content of tetragonal (t) and cubic (c) phase in the zirconia raw material used due to firing at elevated temperatures (e. g. P. V. Ananthapadmanabhan et al., Journal of Material Science, Vol. 24, 1989, pp. 4432-4436).

Therefore, it may be necessary that the sum content of tetragonal and cubic phase of the zirconia raw material basis must be calculated high enough to ensure that the total content of tetragonal and cubic $ZrO_2$ in the final product amounts to at least 20 wt. %, preferably more than 35 wt. %.

The measured total content of tetragonal and cubic $ZrO_2$, using Rietfeld X-ray powder diffraction analysis, provides a well-defined distinguishing characteristic of zirconia refractories. The total content of tetragonal and cubic zirconia is equated to the degree of stabilization.

In view of the above, thermal treatment of especially large-volume zirconia-based refractory lining members with Zr-based parts with up to 250 mm thickness, which would not lead to damages either during manufacturing or/and during later use, is assessed as a challenge. Similar considerations apply to embodiments having a very low thickness, e.g. of less than 10 mm.

It has been found by the applicant that the Zr based refractory lining member according to the invention enables manufacturing and use of Zr-based parts in very thin as well as thick embodiments (e.g. coated and solid bricks/shaped refractories) showing a high resistance to temperature changes, especially when passing through the critical temperature range of approx. 800° C. to 1150° C. The degree of the $ZrO_2$ stabilization (minimum 20 wt. %) efficiently prevents the spreading of possible locally appearing damages, which in particular are caused by thermally induced mechanical stresses, even within large-volume embodiments.

Very thin or thin Zr-based parts may be in form of a coating on a shaped refractory such as a high alumina brick or on a casted dense alumina refractory. In other embodiments the Zr-based parts may be thick in which case the Zr based refractory lining member may consist of the Zr-based part only such as when the Zr based part itself is a shaped Zr based refractory lining member It is well known that $SiO_2$ may preferably be used as a sintering additive for production of dense zirconia materials. For the present purpose, however, it has been found by the applicant that silica as constituent of the bonding phase reveals extremely higher chemical corrosion susceptibility in reducing atmospheres at temperatures above 1000° C., e. g. compared to alumina. Therefore, in order to avoid an undesired formation of volatile siliceous compounds which may lead to fouling of downstream equipment (i.e. waste heat boilers) or to loosening of the member's microstructure and ultimately to destruction, the silica content of the Zr-based parts may be lower than 2.0 wt. %, especially lower than 1.5 wt. % preferably lower than 0.5 wt. %.

According to some advantageous embodiments of the invention, Zr-based parts of the refractory lining member may contain maximum 6 wt. % of $Al_2O_3$, preferably maximum 3.5 wt. of $Al_2O_3$ such as 2.5 wt. % of $Al_2O_3$. $Al_2O_3$ may be present in order to increase in an advantageous manner the content of tetragonal $ZrO_2$. If a crack is developed due to high stress load, a high stress concentration at the crack tip can cause a transformation from the metastable tetragonal $ZrO_2$ to the monoclinic one being associated with a volume expansion, which in turn may push back the propagation of the crack.

In an unexpected way, this material has proven successful in practical application test under strongly reducing atmosphere, elevated temperatures and high process pressures. A noticeable $Al_2O_3$-volatilization has not been determined. However, if the $Al_2O_3$ content is high, such as above 10 wt. the refractory member may lose at least strength which in turn may lead to premature wear.

According to other embodiments of the invention, the thickness of the Zr-based parts of the zirconia-based refractory lining member is in the range between 100 μm to 250 mm, preferably between 150 μm and 160 mm.

Relatively thin Zr-based parts such as 100 μm-1000 μm are not self-supporting, but may still e.g. be used in special setups where the reduction of $Al_2O_3$-volatilization is the primary objective. Therefore, an aspect of the present invention is to provide the zirconia-based refractory lining member with the Zr-based parts as a coating being bonded by thermal treatment at temperatures above 1200° C. with a $Al_2O_3$-based refractory material.

The process for manufacturing such a coated Zr based refractory lining member comprises the following steps:
  providing a shaped refractory $Al_2O_3$-based material, optionally with a corresponding cleaning of the surface to be coated, e. g. removal of dust,
  applying a powder dispersion in form of a conditioned carrier fluid onto at least one surface of the material wherein
  drying followed by a thermal treatment at a temperature above 1200° C.

An $Al_2O_3$-based refractory material being an alumina based refractory material comprising at least 40 wt % preferably at least 85 wt % $Al_2O_3$.

The powder dispersion preferably has a consistency similar to house-paints (viscosity of approx. 2000-6000 mPa·s) and may be applied by way of conventional techniques within the group: spraying, painting, dipping and casting. The coating can be applied several times with the result that an application of a new layer can be performed on both a dried coating as well as onto an already thermal treated one.

Powder dispersions for coating are known from the prior art, where said dispersions include one or more refractory powdered substances in a conditioned carrier liquid, cf. e.g. EP 1506145 B1.

For the production of a coated Zr-based refractory lining member i.e a Zr based refractory lining member, where the Zr-based parts are a coating according to the invention, the dispersion comprises a powder or a powder mixture based on $ZrO_2$, optionally admixed powdered $Al_2O_3$, whereby the mineralogical composition of the $ZrO_2$-carrying ingredients are calculated in such a manner that, the mineralogical composition of the coating according to the invention is obtained after a thermal treatment at a temperature above 1200° C. at close to atmospheric pressures during manufacturing. Powdered $ZrO_2$ already more or less stabilized is preferably used. In this connection, the stabilizing materials are in particular the common oxides such as CaO, MgO, $CeO_2$, $Y_2O_3$ or mixtures thereof.

The dispersed powder or powder mixture presents an average grain size in the range of approximately 2.5 μm to 50 μm, in particular in the range of 5 μm to 25 μm. The grain size has an influence on the formation of the coating layer, i.e. larger gain size means a thicker coating layer and smaller grain size results in higher strength. In an appropriate manner, the average grain size is larger than 7.5 μm to achieve a targeted thick coating formation.

The grain size may be recognizable in the formed coating whereby the average grain size of the obtained coating is in a similar range as in the original powder mixture with approximately 2.5 μm to 50 μm, in particular in the range of 5 μm to 25 μm.

The powder or powder mixture is formulated and present in such an amount that after the thermal treatment the mineralogical composition is characterized by that the Zr based parts comprises at least 90 wt. %, preferably at least 95 wt. % of monoclinic $ZrO_2$ and/or partially stabilized $ZrO_2$ and/or completely stabilized $ZrO_2$, whereby the total content of tetragonal and cubic $ZrO_2$ is at least 20 wt. %, preferably more than 35 wt. %, the $SiO_2$-content is below 2.0 wt. %, especially lower than 1.5 wt. % preferably below 0.5 wt. %.

Surprisingly, it has been found by the applicant, that the coating of the coated Zr based refractory lining member (thin-layered refractory member) according to the invention is bonded to the alumina refractory substrate, even after being exposed to thermal cycling repeatedly. Moreover, its mineralogical composition ensures that it is possible to produce macroscopically crack-free coating layers which over a large area can be produced with a coating-thickness of at least 100 μm, preferably more than 150 μm, especially on surfaces made of alumina refractories as described previously. Desired thicknesses of the coating may be 100 μm-800 μm, such as 150 μm-500 μm.

I.e. the mineralogical composition of the Zr based coating on the alumina refractory substrate enables a Zr based refractory lining member which may be ideal for use in e.g. combustion chambers operating at temperatures above 1000° C. and pressures at least partially above bar preferably in a reducing atmosphere, such as a combustion chamber for producing hydrogen and carbon monoxide rich gases. The Zr coated refractory linking members may provide an inner lining layer presenting an improved resistance against material volatilization compared to the known refractories made from high alumina, even under thermal cycling.

In some particularly favorable embodiments of this invention, the aforementioned coated Zr based refractory lining member (thin-layered zirconia-refractory member) according to the invention is being formed during application "in situ". The combination of high temperature and, in particular, high pressure and a reducing atmosphere present in situ provide a stronger compaction which provides an improved adhesion and a decrease in porosity, which in turn results in an additionally improved protective function against $Al_2O_3$-volatilization of the alumina-substrate. The "in situ" formation of the thin-layered member may be particularly advantageous in existing vessels, as it provides a simple and economic installation of a protective lining in form of a coating on the already existing alumina refractory lining of the combustion chamber. The existing alumina refractory lining can be in form of shaped refractory or in form of a monolithic refractory such as a dense castable.

During in situ formation, the aforementioned thin-layered zirconia-refractory member i.e. a Zr-based refractory lining member with Zr-based part in form of a coating, is being cured by a combination of high temperature and pressure and reducing atmosphere.

In a special embodiment, the formation of the coating takes place in a multi-step in situ process.

In the multi-step in situ process the dispersed powder or powder mixture to form the coating is applied "in situ", where after the Zr-based refractory lining member in a first heating step is heated up to a temperature in the range of 100-500° C. or at least 200-300° C. at an elevated pressure of 1-20 bar or at least 5-10 bar, forming an adhered coating which is at least resistant to e.g. water before introduction of reactive process gas which may contain steam or in which steam is formed. Temperature in the range of 100-500° C. or at least 200-300° C. at an elevated pressure of 1-20 bar or at least 5-10 bar is above the dew point of water in an inert atmosphere (e.g. nitrogen) which means that no or very low amounts of water/substantially no water is present or formed during the first heating step.

The resistance to water is advantageous as the reactive process gas added after the first heating step may be a syngas containing hydrogen and carbon monoxide or a hydrocarbon containing gas but also a hydrocarbon containing gas containing steam in which case the adherence of the coating is particularly important to avoid that the coating is at least partly washed off.

In a second heating step the coated Zr-based refractory lining member is heated, preferably gradually, to above a minimum of 1000° C., and preferable in the range 1100-1300° C. in a reducing reactive process gas comprising hydrogen and carbon monoxide and at elevated pressures of at least 10 bar and preferable at 20 bar or above thereby obtaining a bonded coating (firmly connected coating).

Heating of the coating of the Zr-based refractory lining member applied "in-situ" to the temperature range of 1100-1300° C. in a reducing atmosphere at elevated pressure will form a surface layer of zirconia being bonded with the $Al_2O_3$-based refractory material of the existing lining. Due to the elevated pressure in the second heating step the bonded and sintered coating obtained comprises at least 90 wt. %, preferably at least 95 wt. % of monoclinic $ZrO_2$ and/or partially stabilized $ZrO_2$ and/or completely stabilized $ZrO_2$, whereby the total content of tetragonal and cubic $ZrO_2$ is at least 20 wt. %, preferably more than 35 wt. even in case of temperatures below 1200° C.

The gradually increase of temperature may take place through a heating curve that is continuous increasing or stepped or it could be a combination of continuous increasing and step wise increasing. The first and second heating step may be carried out as two well defined steps or may be carried out in direct continuation of each other.

The types of raw material being used for the production of large-volume zirconia-based refractory members with up to 250 mm thickness such as bricks may be the same as for the coated ones. The only difference may merely be the significantly coarser grain size distribution, whereby zirconia is used in the grain size of up to 4 mm.

The batch composition of raw materials used is calculated in such a manner that the mineralogical composition of the shaped refractory member according to the invention is obtained after the thermal treatment. For example, the sum content of tetragonal and cubic phase of the zirconia raw material basis must be calculated high enough to ensure that the total content of tetragonal and cubic $ZrO_2$ in the final product amounts to at least 20 wt. %, preferably more than 35 wt. % as even a small amount of impurities, for example such as silica or alumina, can lead to a clearly measurable decrease of the sum content of tetragonal (t) and cubic (c) phase in the zirconia raw material used due to firing at elevated temperatures.

In difference to the coated Zr based refractory lining members, a compaction of the crumbly mixture almost exclusively takes place during shaping, in which the shape of the refractory member is defined, instead of during thermal treatment. For shaping, various well-known processes may be used depending, in particular, on number of pieces to be made and complexity of desired geometric shape ("Handbook of Refractory Materials", op. cit.). Preferred shaping processes for thick refractory members such as 20 mm-250 mm are the use of hydraulic presses or manual ramming or casting. The particle size of the batch mixture is 0-4 mm, preferably 0-2.5 mm. The grain size distribution of the batch mixture is not subject to any restrictions in principle, assuming that shaping of the batch is possible. Due to coarser grain size, shaped zirconia refractory members are fired at temperatures above 1400° C., preferably above 1600° C., such as 1400-1800° C. in order to achieve a sufficient strength. According to one embodiment, the cold crushing strength of the fired members, determined in accordance with EN 993-5, is above 30 MPa, preferably between 50 MPa and 200 MPa. A bulk density between 3.80 $g/cm^3$ and 5.40 $g/cm^3$, preferably between 4.00 $g/cm^3$ and 4.80 $g/cm^3$, may be achieved. In this case, the bulk density is determined in accordance with EN 993-1.

Due to the lower thermal conductivity, respectively better thermal insulation properties, compared to dense alumina refractories, Zr based refractory lining members with a thick Zr based part such e.g. where the Zr base refractory lining member is a shaped refractory according to the present invention may be advantageously used in setups where heat transition is an additional critical parameter.

For example, in the manhole area of vessels, operating the non-catalytic process, the temperature at the metallic outside shell of the combustion chamber may reach a material-critical value when lined with dense alumina refractories at the hot face. In order to avoid a premature shut-down, a forced outside cooling would be absolutely necessary. When installing a zirconia based refractory lining member instead of alumina refractories, the outside temperature may be decreased with increasing thickness of the zirconia layer.

For example in vessels, operating the catalytic steam reforming process, even underneath the bottom lining of the combustion chamber, alumina-volatilization has been found to take place from the catalyst within the uppermost part of the catalyst bed when the catalyst is mainly based on an alumina-based support material. The alumina-volatilization may be reduced by installing adequate thick zirconia based refractory lining members in the bottom of the combustion chamber for better heat insulation. As described above, a very low decrease in temperature may have a strong impact on the degree of volatilization, which may also result in a prolongation of the catalyst runtime.

Besides an improved resistance against material volatilization and advantageous better thermal insulation properties compared to alumina refractories, shaped zirconia based refractory lining members according to the present invention provide another advantageous feature when being installed in the bottom of the combustion chamber of a vessel operating the catalytic process. Due to their higher bulk density, they are less prone to movement and displacement by the fluid dynamic gas flow in the combustion chamber than dense alumina refractories of the same layer-thickness.

Thus, the present invention provides a versatile Zr based refractory lining member which may be in form of a Zr coated refractory and/or in form of a shaped Zr based refractory lining member. The various embodiments provide unprecedented possibilities for solutions for design of linings in e.g. combustion chambers where the different advantageous features of the coated and shaped Zr based refractory lining members may be applied to achieve a highly optimized and specialized inner lining taking into account the reducing atmosphere, elevated temperatures and high process pressures prevailing in the combustion chamber during operation.

The present invention also relates to a refractory lining in a combustion chamber operating in a reducing atmosphere, comprising one or more of the Zr based refractory lining members described herein.

EXAMPLES AND FIGURES

The object of the invention is described in greater detail in the accompanying drawings and following examples without thereby limiting the object of the invention. Examples and FIG. are not to be construed as limiting to the invention.

Example 1

FIG. 1 is a cross-sectional electro microscopic image showing the structure of a zirconia based refractory lining member in form of a coating on a $Al_2O_3$ based refractory material according to the invention (89 times enlarged). The fine-grained crack-free coating is approximately 250 μm to 300 μm thick and firmly bonded to the coarse-grained alumina refractory.

A conditioned powder dispersion having a consistency similar to house-paints was applied in a layer of a thickness of approximately 500 μm by way of spraying onto an untreated surface (approximately 230 mm×114 mm) of an alumina refractory brick ($Al_2O_3$-content approximately 99.6 wt. %). The average grain size of the partially stabilized fused $ZrO_2$-powder used was 11.75 μm (laser diffraction), and the solids content of the powder dispersion was 68 wt. %. The coated and dried brick was thermal treated at a temperature well above 1200° C. Due to the drying and in particular the thermal treatment, the coating was compacted to a total thickness of approximately 250 μm, which is in an advantageous matter accompanied with the formation of a very high strength, an excellent connection of the coating onto he alumina substrate.

Determined by X-ray powder diffraction, the macroscopic crack-free coating had a total content of tetragonal and cubic $ZrO_2$ of 46 wt. %, the measured silica content was 0.20 wt. and the alumina-content was 3.30 wt. %.

For further tests, coated specimens of approximately 65 mm×45 mm×20 mm were taken out of the sample, which represents 65 mm×45 mm of the hot face surface. A specimen was heated to a temperature of approximately 950° C. and subsequently quenched in cold water. Even after four further cycles of rapid temperature changes (heating and water quenching), no macroscopically detectable formation of cracks was found. A second specimen was treated five times by thermal cycling within a temperature range from room temperature to approximately 1400° C. The heating and cooling rates were approximately 100° C./h, as above without detectable damages. No detachment of the coating was observed after repeated cycles of rapid temperature changes i.e. it was found that the coating was bonded to the substrate.

Examples 2 and 3

In preparing shaped Zr based refractory lining members two different prepared batch compositions were shaped to bricks having a thickness of about 100 mm and a weight of about 10-15 kg, whereby uniaxial pressing procedure was used (about 80 MPa pressing pressure). After appropriate drying, the bricks were then fired at 1720° C. The raw-material batch composition of example no. 2 was adjusted to reach a total content of tetragonal and cubic $ZrO_2$ after firing of about 90 wt. whereby fully stabilized fused $ZrO_2$ was used as raw-material basis. Accordingly, the composition of the Example No. 3 was calculated to reach a total content of tetragonal and cubic $ZrO_2$ after firing of below 20 wt. % by using a blend of monoclinic and partially stabilized fused $ZrO_2$. The grain size used in Example No. 2 and 3 was 0-2.5 mm, whereby the grading fraction of less than 63 μm had an amount of approx. 25 wt.-%.

After firing, the properties of a brick of Example No. 2 were as follows: bulk density of 4.60 g/cm³, cold crushing strength of 70 MPa, $SiO_2$-content of 0.10 wt. $Al_2O_3$-content of 0.31 wt. and 87 wt. % of total content of tetragonal and cubic $ZrO_2$; no macroscopically detectable formation of cracks were found. A brick sample was also treated five times by thermal cycling within a temperature range from room to approximately 1400° C. without macroscopically detectable crack formation. The heating and cooling rates were about 100° C./h.

Bricks of Example no. 3 showed strong cracking already after the production-firing. The measured total content of tetragonal and cubic $ZrO_2$ was 17 wt. % ($SiO_2$-content of 0.40 wt. $Al_2O_3$-content of 0.20 wt. %).

The improved performance of Zirconia based refractory lining members according to the present invention, both the coated and the brick (shaped refractory) embodiment, were successfully demonstrated in the combustion chamber of a vessel for industrial production of syngas using the catalytic process. During demonstration the material was subjected to thermal cycling repeatedly. The demonstrated zirconia materials showed themselves to be superior to conventional alumina bricks. An up to 85% reduction of the material volatilization was found and the material retained its structural integrity and stability post operation.

Figure 2A:
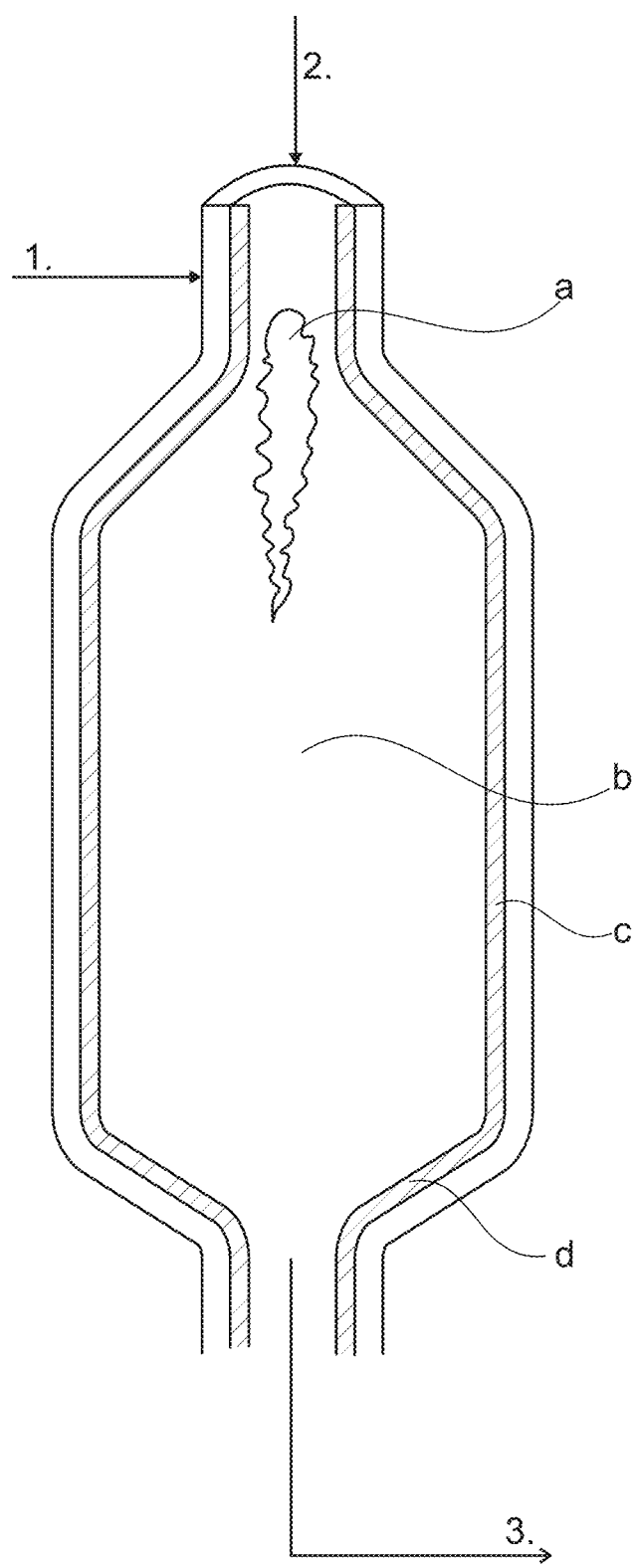
FIGS. 2a and 2b show a combustion chamber in a gasification reactor.
Figure 2B:
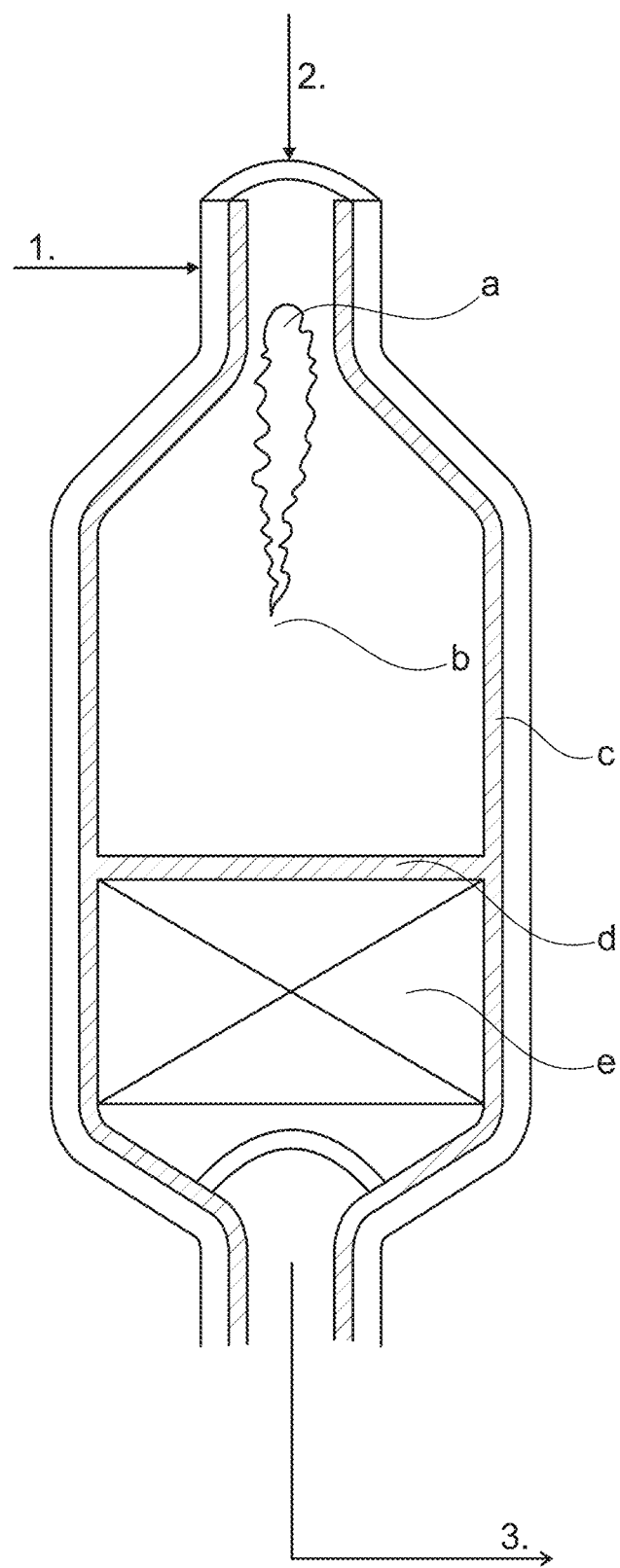

FIGS. 2a and 2b show a combustion chamber in a gasification reactor which may form an integral part of the synthesis gas generation section of plants for production of chemicals such as methanol, ammonia and synthetic fuels. The feed is introduced at the top of the gasification unit through line (1) and converted to $H_2$ and CO in the combustion chamber (b) by the burner (a) with air or oxygen introduced through line (2). The synthesis gas product leaves the reformer through an outlet channel line (3). The combustion chamber (b) is enclosed by combustion chamber lining comprising wall tiles (c) and a partitioning channel (d) and/or partitioning layer (d) to downstream sections. In FIG. 2b the partitioning to downstream section is in form of a permeable refractory material layer of a hold-down material (d) placed on the top of a fixed bed of catalyst pellets (e) separating the combustion chamber from the underneath situated catalyst bed. The uppermost surface of the partitioning (d) act as the bottom lining of the combustion chamber. The burner (a) can be a generic shower head burner, but often more complex burners including high degrees of swirl are used. Such burners generate high flow velocities, which can be high enough to move the catalyst pellets. Such movement leads to ball milling of the catalyst resulting in degradation of the catalyst pellets and fouling of the bed with the dust produced. Therefore, to prevent this, the top of the bed is covered with a layer of large pieces of a refractory hold-down material, typically manufactured from a high alumina material, either as a hydraulic presses or a castable refractory material. These materials are much larger than the catalyst pellets and are not affected by the gas movement.

Figure 3A:
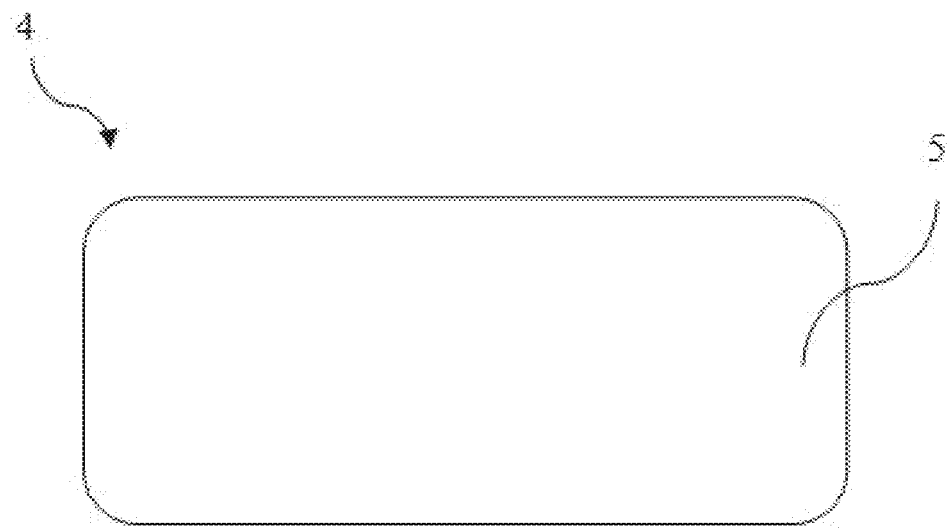
FIGS. 3a and 3b show embodiments of Zr based refractory members according to the present invention.
Figure 3B:
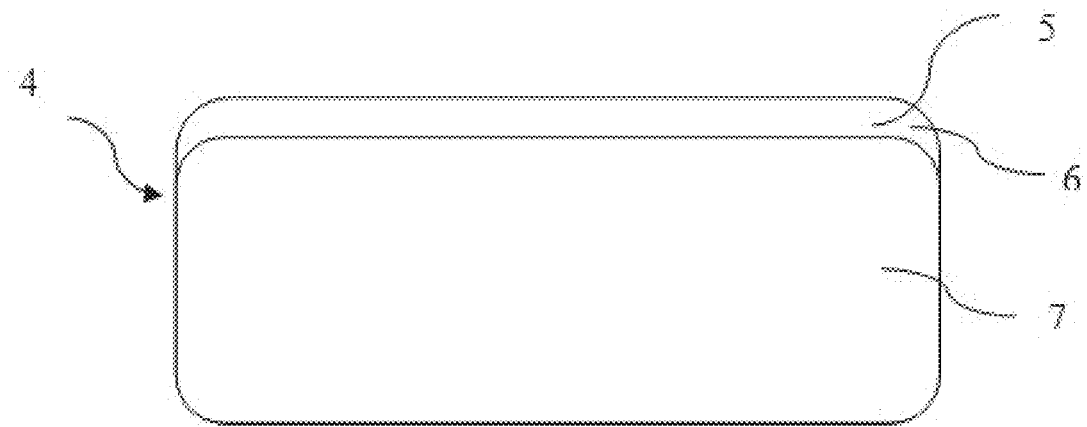

FIGS. 3a and 3b show to embodiments of Zr based refractory members 4 according to the present invention. In FIG. 3a the Zr based refractory member consists of a single Zr based part only. I.e. the Zr based refractory member is shaped refractory in form of a solid brick. In 3b the Zr based refractory member comprise a Zr based part 5 in form of a coating on a shaped refractory 7 such as an alumina based refractory. A refractory lining according to the present invention may comprise solid bricks (shaped refractories) as shown in 3a and/or coated bricks as shown in FIG. 3b.

The invention claimed is:

1. A combustion chamber operating in a reducing atmosphere comprising a refractory lining, wherein the refractory lining comprises a shaped and fired zirconia refractory material in the form of a brick based on granular CaO and/or MgO stabilized fused zirconia raw material low in silica, consisting essentially of crystalline zirconia, wherein the fired refractory material comprises a total content of tetragonal and cubic $ZrO_2$ measured by X-ray powder diffraction analysis of at least 20% by weight, wherein the tetragonal $ZrO_2$ is in the t-phase, wherein the $Al_2O_3$ content is 0.05-6% by weight, and wherein the $SiO_2$ content of bonding phase of the material is below 1.5% by weight.

2. A combustion chamber operating in a reducing atmosphere according to claim 1, wherein the shaped and fired zirconia refractory forms at least part of a combustion chamber refractory lining, including at least part of an inner hot face wall lining and/or a partition to downstream.

3. A combustion chamber operating in a reducing atmosphere according to claim 1, wherein the combustion chamber is a combustion chamber for producing syngas comprising $H_2$ and CO.

4. A combustion chamber operating in a reducing atmosphere according to claim 1, wherein brick has a bulk density of 3.80 g/cm$^3$-5.40 g/cm$^3$.

* * * * *